United States Patent
Palmer et al.

(10) Patent No.: US 6,308,919 B1
(45) Date of Patent: Oct. 30, 2001

(54) SPACECRAFT HAVING A DUAL REFLECTOR HOLDDOWN FOR DEPLOYING MULTIPLE REFLECTORS IN A SINGLE RELEASE EVENT

(75) Inventors: Tyler A. Palmer, San Francisco; Varouj G. Baghdasarian, Cupertino, both of CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/558,444

(22) Filed: Apr. 25, 2000

(51) Int. Cl.$^7$ ........................................ B64G 1/22
(52) U.S. Cl. ........................................ 244/158 R
(58) Field of Search .................. 244/158 R, 168, 244/173; 269/134

(56) References Cited

U.S. PATENT DOCUMENTS 4,491,446 * 1/1985 Ewald .

FOREIGN PATENT DOCUMENTS

| 2517626 | * | 6/1983 | (FR) | ................................. | 244/158 R |
| 267876 | * | 6/1983 | (EP) | ................................. | 244/158 R |
| 87/04372 | * | 7/1987 | (WO) | ................................. | 244/158 R |

* cited by examiner

Primary Examiner—Charles T. Jordan
Assistant Examiner—Tien Dinh
(74) Attorney, Agent, or Firm—Kenneth W. Float

(57) ABSTRACT

A spacecraft having nested reflectors that are released and deployed during a single release event using one or more dual reflector holddowns. The nested reflectors are held in place prior to release by the holddowns and are released during the single release event. The nested reflectors are secured to the body of the spacecraft by hinges attached to respective reflector backup structures and are releasably secured to the body using the one or more dual reflector holddowns. The reflector backup structures are secured by reflector interface brackets of the respective holddowns. An exemplary holddown has a separable tubular housing that is longitudinally secured together between an end cap and a release device. A threaded shaft 28 extends through the tubular housing, the end cap and the release device. A retraction spring is disposed around the exterior of the housing. The reflector interface brackets are secured to the outer and inner housings that attach the plurality of reflectors to the holddown.

15 Claims, 7 Drawing Sheets

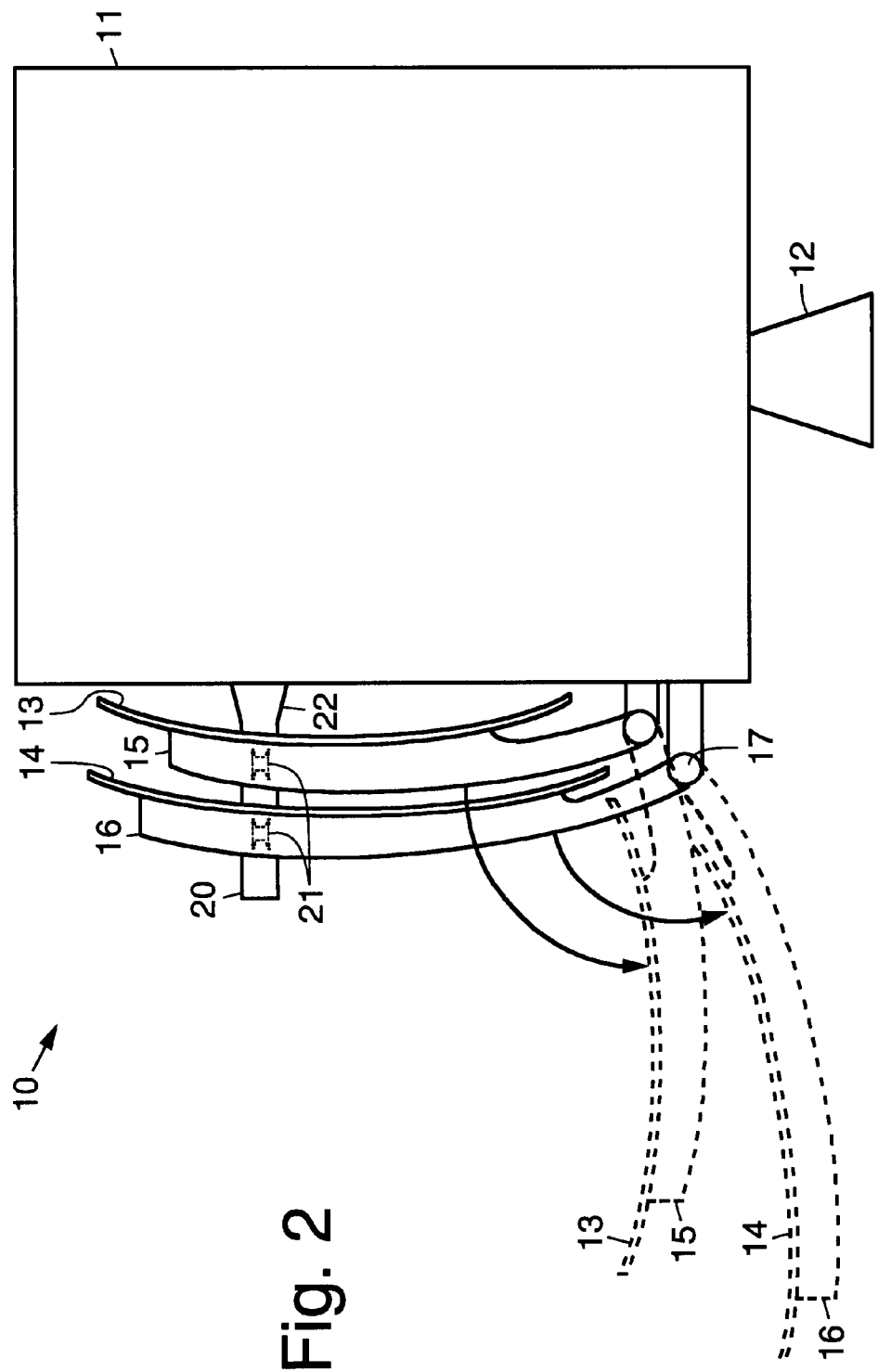

Fig. 5
Fig. 6
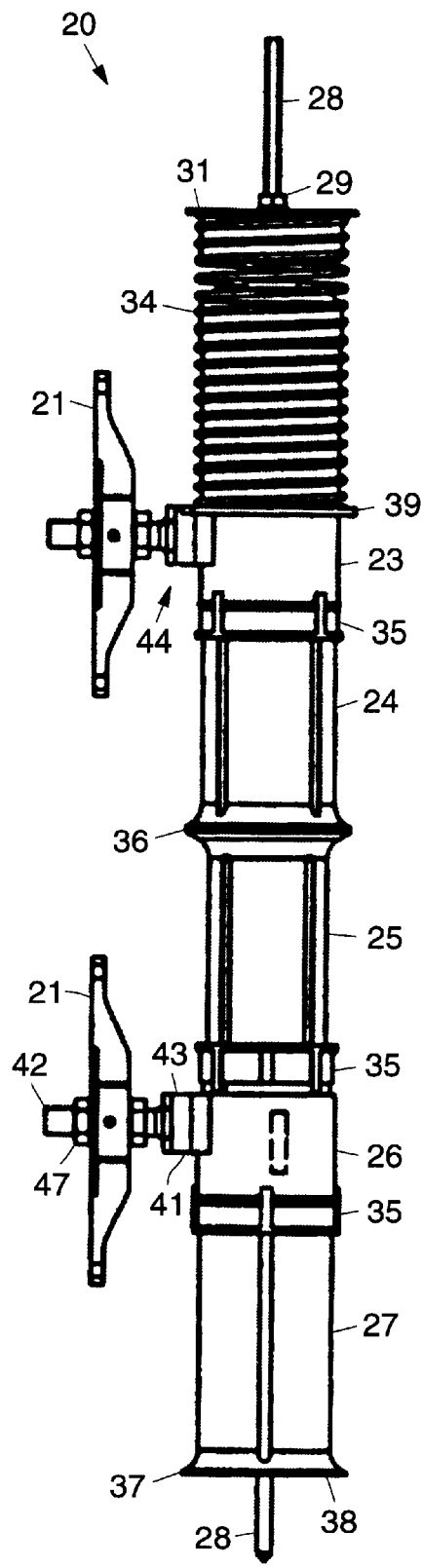
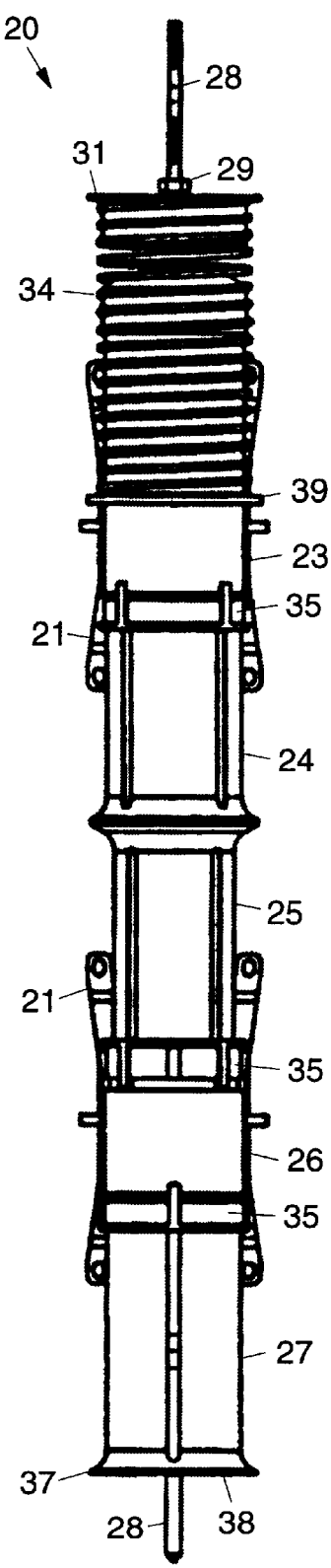

SPACECRAFT HAVING A DUAL REFLECTOR HOLDDOWN FOR DEPLOYING MULTIPLE REFLECTORS IN A SINGLE RELEASE EVENT

BACKGROUND

The present invention relates generally to spacecraft, and more particularly, to a dual reflector holddown for use in supporting and deploying nested reflectors disposed on a spacecraft.

The assignee of the present invention manufactures and deploys spacecraft that have reflectors (communication antennas) disposed on the spacecraft body that are used to reflect communication signals. Heretofore, nested reflectors have not been used on any spacecraft developed by the assignee of the present invention. Single reflectors are supported and released by commonly available holddowns. Part numbers E008080-01 and E028600-01 manufactured by the assignee of the present invention are examples of such commonly available holddowns. However, it would be desirable to provide for the use and deployment of nested reflectors on spacecraft.

Accordingly, it would be advantageous to have a dual reflector holddown for use in supporting and deploying nested reflectors disposed on a spacecraft.

SUMMARY OF THE INVENTION

The present invention provides for a spacecraft having nested reflectors that are released and deployed during a single release event. One or more dual reflector holddowns are provided that support and deploy the nested reflectors. The nested reflectors are held in place prior to release by the one or more dual reflector holddowns and then released using a ground command during the release event.

The spacecraft has a body to which the nested reflectors are secured using the one or more dual reflector holddowns. Reflector backup structures are secured to rear surfaces of the reflectors. The reflector backup structures each comprise a generally triangular tubular structure connected to a hinge and to the rear surfaces of the respective reflectors. The reflector backup structures are secured to the dual reflector holddowns by means of reflector interface brackets that are part of the dual reflector holddowns located adjacent vertices of the triangular tubular structure. The dual reflector holddowns releasably secure the reflector backup structures to the body.

An exemplary dual reflector holddown comprises a separable tubular housing which may include an outer housing, an outer insert, a middle insert, and inner housing and an inner insert longitudinally secured together, using a single (tensioned) rod. An end cap and a release device are disposed on opposite ends of the tubular housing. The rod extends axially through the end cap, the tubular housing and the release device. The rod is secured by a nut at the end cap and a ball retained by the release device. A retraction spring is disposed around the exterior of the housing adjacent to the end cap. Reflector interface brackets are secured to the housing that attach the plurality of reflectors to the holddown.

The one or more dual reflector holddowns may be used to support the reflectors during launch and orbit raising of the spacecraft. The single release event separates components of the outer reflector holddown from the components of the inner reflector holddown, and components of the inner reflector holddown from interfaces on the spacecraft. The reflectors are then free for deployment.

The various housings of the dual reflector holddown are mutually threaded and hence adjustable along the axis of the holddown. The dual reflector holddown also has three rotational degrees of freedom due to the construction of the interface brackets and the manner in which they are attached to their respective housings. Furthermore, the dual reflector holddown also has zero, one or two translational degrees of freedom due to the adjustable floating interfaces at the holddown attachments to the reflector backup structure.

BRIEF DESCRIPTION OF THE DRAWINGS

The various features and advantages of the present invention may be more readily understood with reference to the following detailed description taken in conjunction with the accompanying drawings wherein like reference numerals designate like structural elements, and in which:

FIG. 2 is a side view of the spacecraft shown in FIG. 1;

FIG. 5 is a side view of the dual reflector holddown;

FIG. 6 is a rear view of the dual reflector holddown;

DETAILED DESCRIPTION

Figure 1:
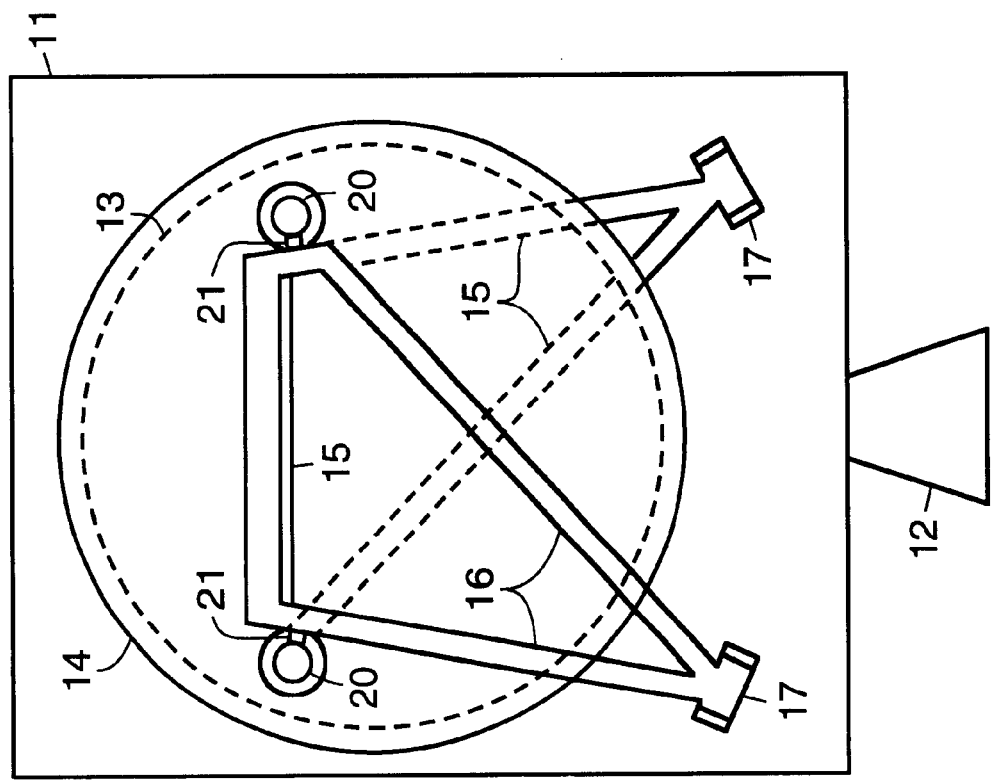
FIG. 1 is a front view of an exemplary spacecraft employing a dual reflector holddown in accordance with the principles of the present invention.

Referring to the drawing figures, FIG. 1 is a front view of an exemplary spacecraft 10 employing two dual reflector holddowns 20 in accordance with the principles of the present invention. The spacecraft 10 comprises a body 11 and one or more engines 12. The exemplary spacecraft 10 is shown having two nested reflectors 13, 14 (inboard and outboard reflectors 13, 14) secured to the body 11 by means of the two dual reflector holddowns 20. The two nested reflectors 13, 14 are released and deployed during a single release event.

Inboard and outboard reflector backup structures 15, 16 are secured to rear surfaces of the respective reflectors 13, 14. The inboard reflector 13 is beneath the outer reflector 14 and is shown along with the hidden portion of the inboard reflector backup structure 15 by means of dashed lines. The inboard and outboard reflector backup structures 15, 16 each comprise a generally triangular tubular structure connected to a hinge 17 and to the rear surfaces of the respective reflectors 13, 14, respectively.

The inboard and outboard reflector backup structures 15, 16 are secured to the body 11 by the respective hinges 17. The inboard and outboard reflector backup structures 15, 16 are also secured to the two dual reflector holddowns 20 by means of reflector interface brackets 21 that are part of the dual reflector holddowns 20 located adjacent vertices of the triangular tubular structure that are distal from the hinge 17.

Figure 9:
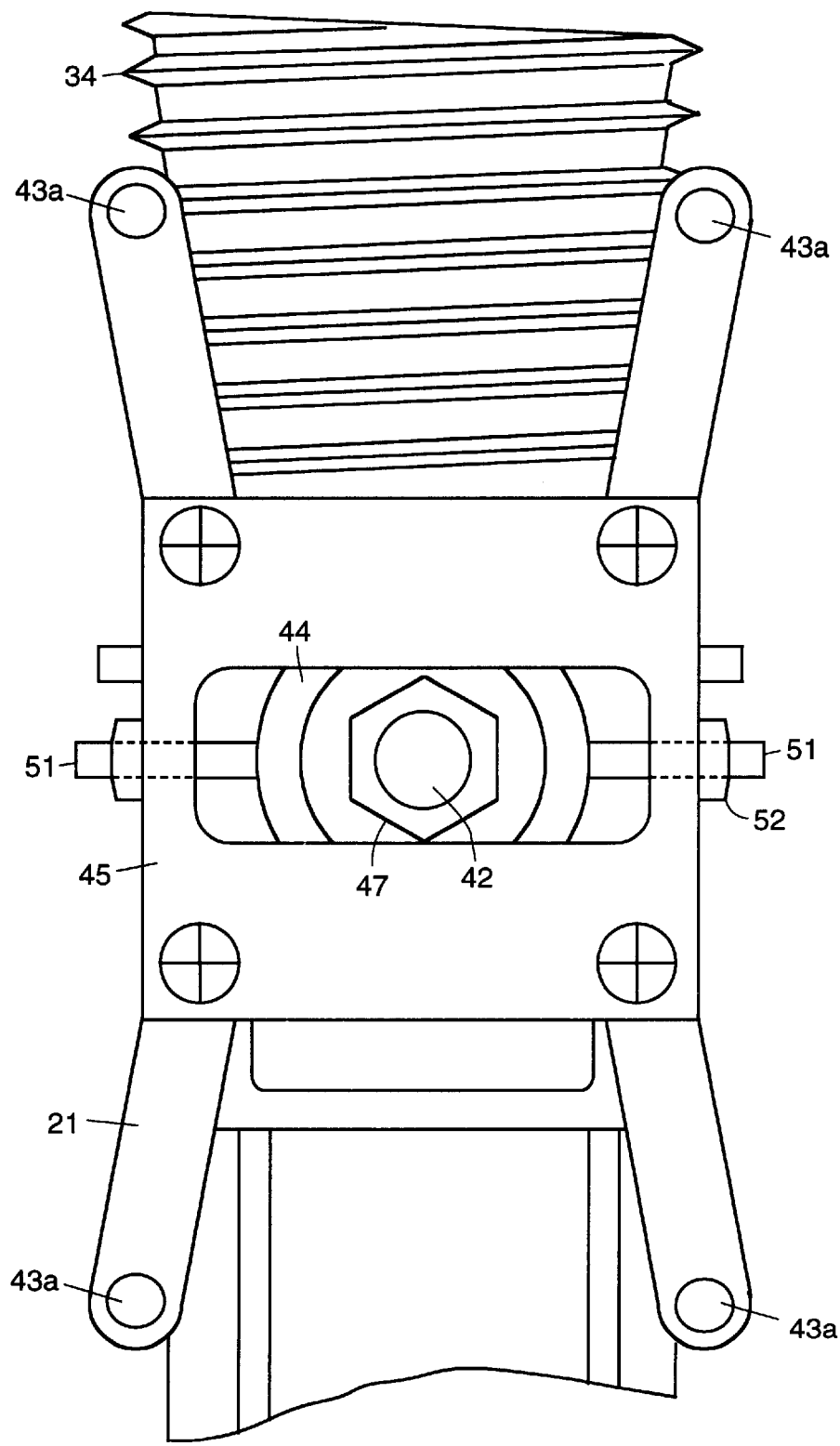
FIG. 9 is an enlarged top view of the reflector interface bracket shown in FIG. 4.

FIG. 2 is a side view of the spacecraft 10 shown in FIG. 1. FIG. 9 shows the inboard and outboard reflectors 13, 14 in their respective stowed positions (solid lines) prior to the release event, and in their respective deployed positions (dashed lines) after the release event. The curved arrows indicate motion of the reflector backup structures 15, 16 and reflectors 13, 14 from their stowed positions to their deployed positions.

The two dual reflector holddowns 20 each comprise two reflector interface brackets 21 (shown in phantom) that are respectively secured to the inboard and outboard reflector backup structures 15, 16. This is shown in more detail in FIG. 3, for example. Also, the two dual reflector holddowns 20 are secured to the body 11 of the spacecraft 10 using respective attachment members 22.

Figure 4:
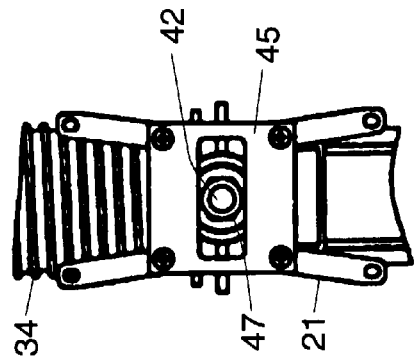
FIG. 4 shows a front view of one reflector interface bracket used in the dual reflector holddown.
Figure 3:
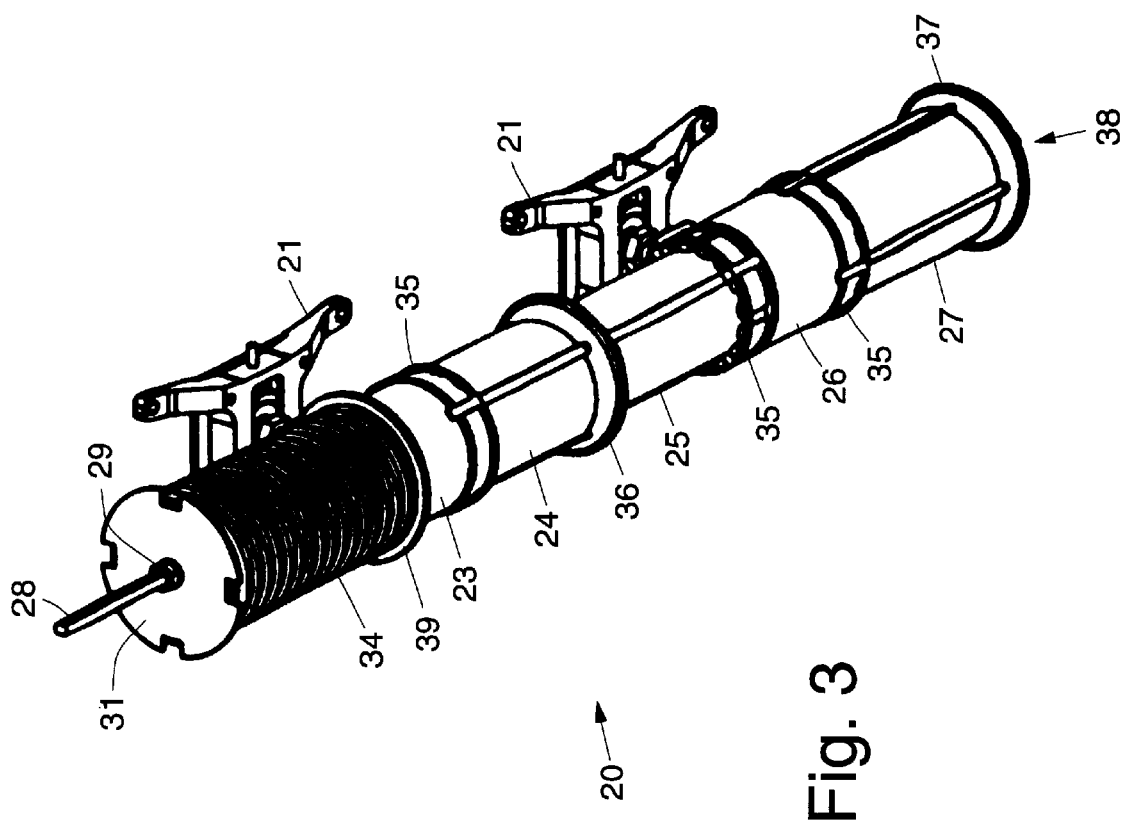
FIG. 3 is a perspective view of the dual reflector holddown in accordance with the principles of the present invention.
Figure 7:
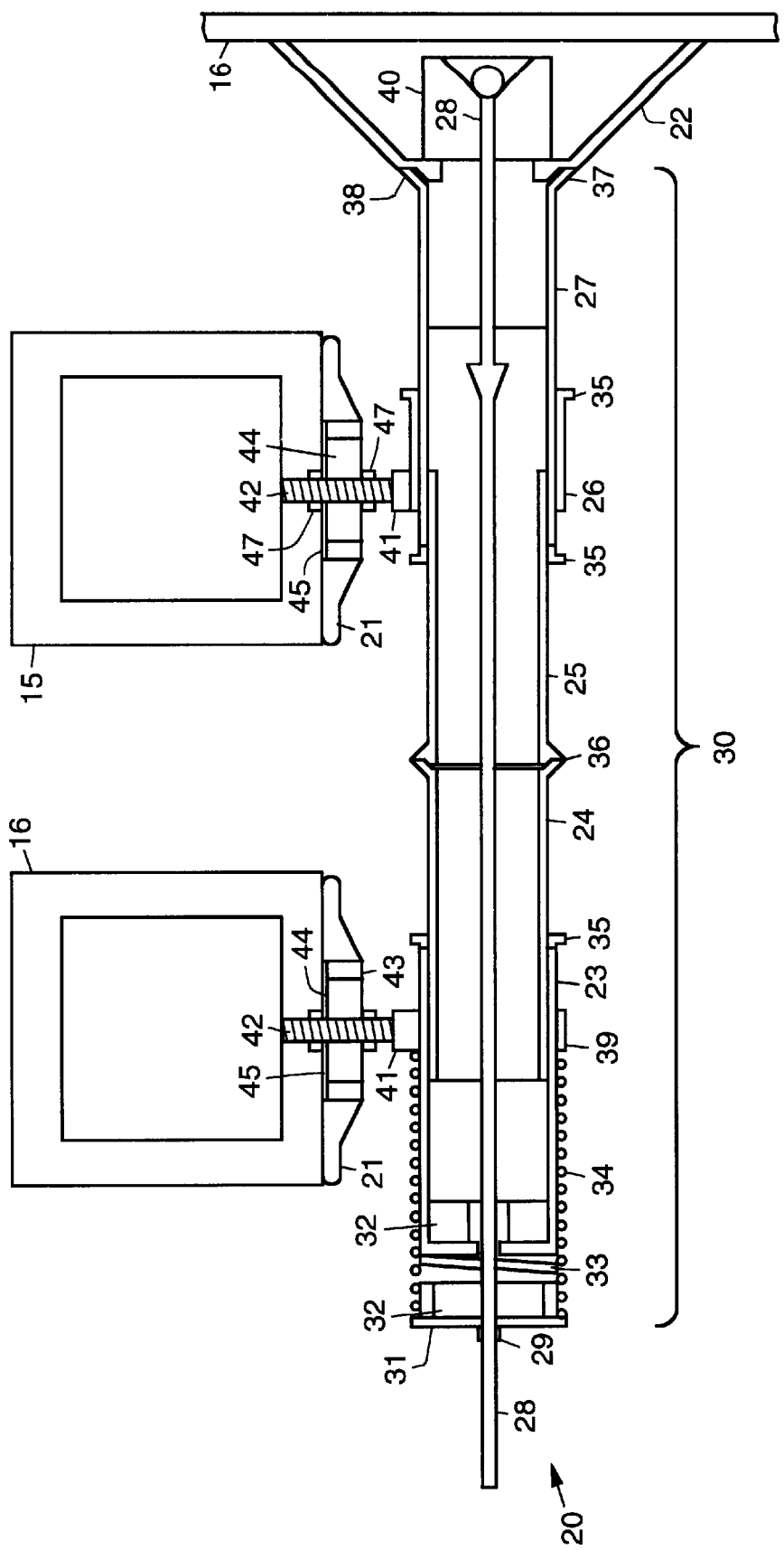
FIG. 7 is a cross-sectional side view of the dual reflector holddown attached to a reflector backup structure.
Figure 8:
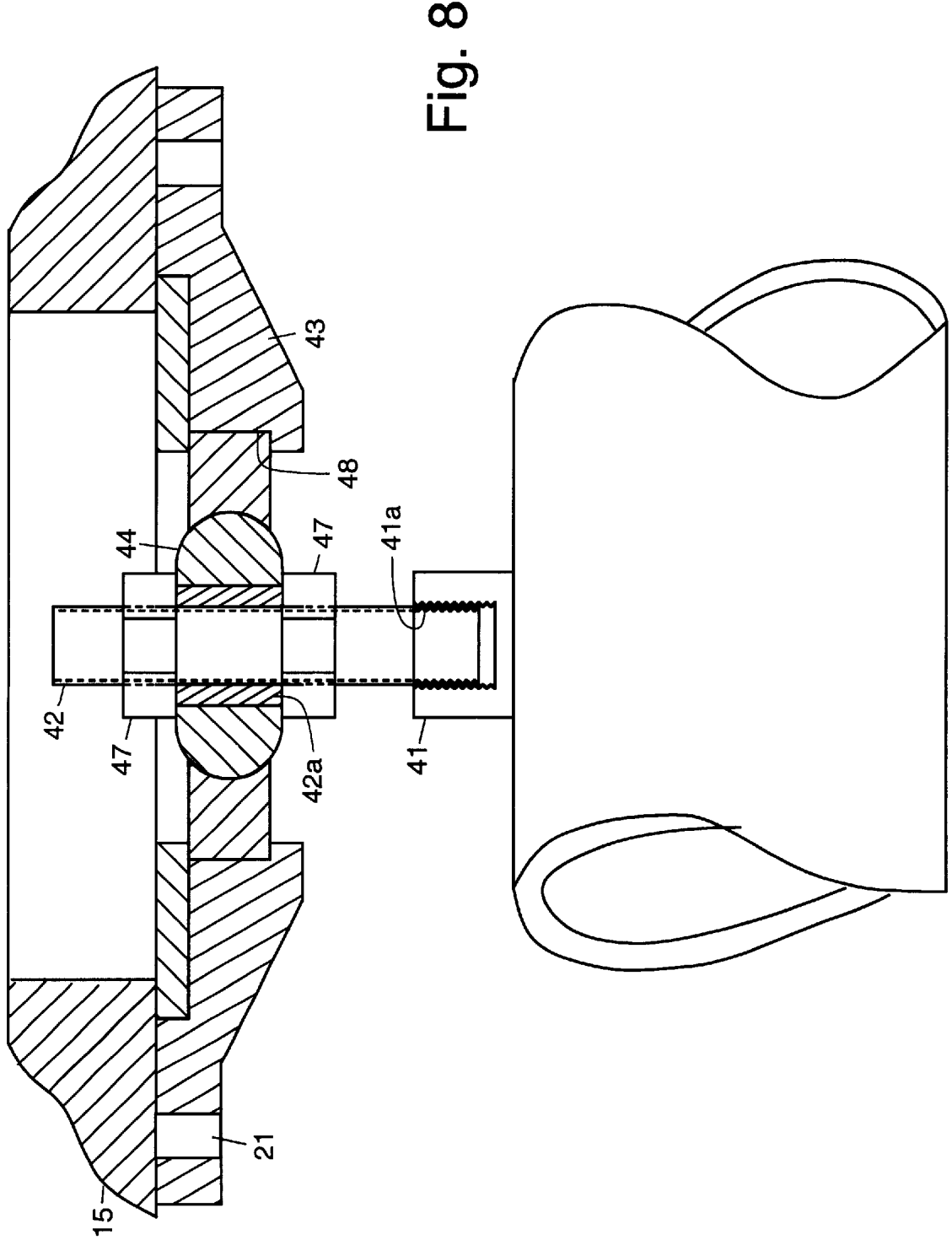
FIG. 8 is an enlarged view of the interface between the reflector backup structure and a reflector interface bracket.

FIG. 3 is a perspective view of the dual reflector holddowns 20. FIG. 4 shows a front view of one reflector interface bracket 21. FIGS. 5 and 6 show side and front views of the dual reflector holddown 20. FIG. 7 is a cross-sectional side view of the dual reflector holddown 20 attached to one of the reflector backup structures 15, 16. FIG. 8 is an enlarged view of the interface between the reflector backup structures 15, 16 and the reflector interface bracket 21. FIG. 9 is an enlarged top view of the reflector interface bracket 21 shown in FIG. 4.

As is shown in FIGS. 3, 5, 6 and 7, the dual reflector holddown 20 comprises a separable tubular housing 30, which may be cylindrical, having an end cap 31 and a release device 40 disposed on respective ends thereof. The exemplary tubular housing 30 is comprised of an outer housing 23, an outer insert 24, a middle insert 25, and inner housing 26 and an inner insert 27. The housings 23, 26 and inserts 24, 25, 27 are threaded with internal and external threads to provide for axial adjustability, are secured to each other by means of a plurality of snap rings 35, and this assembly is longitudinally held together under compression by means of a threaded tensioned rod 28. The essence of the separable tubular housing 30 is that its separable components separate upon initiation of the release event so that the reflector backup structures 15, 16 and reflectors 13, 14 are free to deploy.

The end cap 31 and release device 40 each have a central hole disposed therein. The threaded tensioned rod 28 extends through the end cap 31 and release device 40 and protrudes outside of the dual reflector holddown 20. The release device 40 is secured to the spacecraft 20 by means of the attachment member 22. A spring retaining nut 29 threaded over the threaded tensioned rod 28 retains a retraction spring 34 and end cap 31.

As is shown in FIG. 7, the retraction spring 34 is disposed around the outermost portion of the exterior of the outer housing 23 which is retained between the end cap 31 and a retainer 39 and is secured by means of the spring retaining nut 29. Rhea inner end of the tensioned rod 28 is held by the release device 40. The release device 40 is actuated by means of a ground command.

An outboard reflector-holddown separation interface 36 is formed at the juncture between the outer insert 24 and the middle insert 25. An inboard reflector-holddown separation interface 38 is formed at the juncture between the inner insert 27 and the attachment member 22.

The outer and inner reflector interface brackets 21 are secured to the outer and inner housings 23, 26 respectively. Details of the outer and inner reflector interface brackets 21 are shown more clearly in FIGS. 3, 4, 5 and 7. As is shown in FIGS. 3, 4, 5 and 7, the outer and inner reflector interface brackets 21 comprise a generally flat surfaced H-shaped member with a central opening therein. Outer ends of the surfaced H-shaped member have holes 43a therein that are used to secure the outer and inner reflector interface brackets 21 to the reflector backup structures 15, 16. The inboard and outboard reflector backup structures 15, 16 may be secured to the reflector interface brackets 21 using a plurality of machine screws, for example.

The outer and inner reflector interface brackets 21 comprise a bearing housing 43 which houses a spherical bearing 44 that is retained therein by means of a bearing retainer plate 45. The outer and inner reflector interface brackets 21 comprise a threaded shaft 42 that extends laterally outward from the surface of the housing 30. The H-shaped reflector interface brackets 21 are secured to the threaded shaft 42 by means of two locking nuts 47 on either side of the bearing 44 mounted on the reflector interface bracket 21.

The position of each H-shaped reflector interface bracket 21 relative to the housing 30 is thus adjustable along the axis of the threaded shaft 42. The angular orientation of each H-shaped reflector interface bracket 21 is also adjustable because the spherical bearing 44 allows freedom for angular rotation. The radial boss 41 is respectively disposed on the outer and inner housings 23, 26 which secures the outer and inner reflector interface brackets 21 to the housing 30 by means of the threaded shafts 42.

The two nested reflectors 13, 14 are held in place prior to release by the dual reflector holddowns 20 and are released during a single release event. The functioning of the dual reflector holddowns 20 during the release event to deploy the reflectors 13, 14 is as follows.

Referring to FIG. 8, it is an enlarged view of the interface between the reflector backup structures 15, 16 and a reflector interface bracket 21. The threaded shaft 42 is secured into a threaded interface 41a in a radial boss 41. The spherical bearing 44 is secured to the threaded shaft 42 by mean of the axial locating nuts 47. The spherical bearing 44 is thus adjustable along the length of the threaded shaft 42. By sizing the sleeve 42a, the bearing 44 can slide back and forth on the sleeve 42a, therefore providing an axial degree of translational freedom. The reflector interface bracket 21 interfaces to the spherical bearing 44 by means of a slot 48 that allows the bearing 44 to slide relative to the bearing housing 43 (into and out of the plane of the drawing). The spherical bearing 44 allows three degrees of rotation which is not locked. The spherical bearing 44 provides for adjustment resulting from angular misalignment. Therefore, the holddown-to-reflector interface provides three rotational and two translational degrees of freedom.

FIG. 9 is an enlarged top view of the reflector interface bracket 21 shown in FIG. 4. Two threaded set screws 51 extend through opposite sides of the reflector interface bracket 21 and are secured by set screw locking nuts 52. These set screws 51 may be used to lock the bearing 44 to prohibit axial sliding, if required.

In operation, the dual reflector holddown 20 is actuated by a ground command, which releases the (restrained) ball end of the tensioned rod 28 secured by the release device 40. Upon release of the tensioned rod 28, the retraction spring 34 pulls the rod 28 out of the assembly and holds it behind the outboard reflector. Once the rod 28 is retracted, each reflector is free to be driven out using an electric motor and gear train mechanism designed into the hinge assembly. In essence, the hinge assembly acts as a motor. Therefore, using the ground command, the outboard reflector is driven out and positioned in its deployed position. Then, the inboard reflector is driven out to its deployed position using the other hinge and motor.

In summary, the present invention provides for a holddown 20 for use in securing dual nested reflectors 13, 14. The nested reflectors 13, 14 are released using a single command and single release device. Components of the dual reflector holddown 20 are tensioned together using a single tensioned rod 28. The holddown-to-reflector interface provides three rotational and two translational degrees of freedom. The holddown 20 is adjustable in length by incorporating threaded tubes, or the like.

Thus, a dual reflector holddown for use in supporting and deploying nested reflectors disposed on a spacecraft has been disclosed. It is to be understood that the described embodiment is merely illustrative of one of the many specific embodiments that represent applications of the principles of the present invention. Clearly, numerous and other arrangements can be readily devised by those skilled in the art without departing from the scope of the invention.

What is claimed is:

1. A spacecraft comprising:

a body;

inboard and outboard nested reflectors;

inboard and outboard reflector backup structures secured to rear surfaces of the respective reflectors;

first and second hinges for securing the reflector backup structures to the body; and one or more dual reflector holddowns for releasably securing the reflector backup structures and reflectors to the body.

2. The spacecraft recited in claim 1 wherein the one or more dual reflector holddowns release and deploy the reflectors during a single release event.

3. The spacecraft recited in claim 1 wherein each dual reflector holddown comprises:

a separable tubular housing;

an end cap disposed at one end of the tubular housing;

a release device disposed at an opposite end of the tubular housing;

a tensioned rod extending through the tubular housing, the end cap and the release device;

a retraction spring; and outer and inner reflector interface brackets secured to the tubular housing for securing the plurality of reflectors to the holddown.

4. The spacecraft recited in claim 1 wherein the inboard and outboard reflector backup structures each comprise a generally triangular tubular structure connected to the hinge and to the rear surfaces of the respective reflectors.

5. The spacecraft recited in claim 3 wherein the separable tubular housing comprises an outer housing, an outer insert, a middle insert, and inner housing and an inner insert which are longitudinally secured together with the tensioned rod.

6. A dual reflector holddown for use in deploying a plurality of reflectors disposed on a spacecraft during a single release event, comprising:

a separable tubular housing;

an end cap disposed at one end of the tubular housing;

a release device disposed at an opposite end of the tubular housing;

a threaded shaft extending through the tubular housing, the end cap and the release device;

a retraction spring; and outer and inner reflector interface brackets secured to the tubular housing for securing the plurality of reflectors to the holddown.

7. The dual reflector holddown recited in claim 6 wherein the tubular housing comprises an outer housing, an outer insert, a middle insert, and inner housing and an inner insert which are longitudinally secured together using the tensioned rod.

8. The dual reflector holddown recited in claim 6 further comprising:

an outboard reflector-holddown separation interface formed at a juncture between the outer insert and the middle insert, and an inboard reflector-holddown separation interface formed at the juncture between the inner insert and the attachment member that permit separation of the tubular housing during deployment of the plurality of reflectors.

9. The dual reflector holddown recited in claim 6 wherein the retraction spring is disposed around an outermost portion of the exterior of the outer housing which is retained between the end cap and a retainer.

10. The dual reflector holddown recited in claim 6 wherein the reflector interface brackets each comprise a generally flat surfaced H-shaped member.

11. The dual reflector holddown recited in claim 6 further comprising:

a threaded shaft that extends laterally outward from the surface of the housing;

a bearing housing containing a bearing 44 secured to the reflector interface bracket; and first and second locking nuts disposed on either side of the bearing housing and reflector interface bracket 21 for adjustably securing them to the threaded shaft.

12. The dual reflector holddown recited in claim 6 wherein the sections are adjustable with respect to each other using threaded tubes.

13. The dual reflector holddown recited in claim 6 wherein the sections are adjustable with respect to each other using discrete adjustment means.

14. The dual reflector holddown recited in claim 6 wherein the reflector attachment assembly includes a spherical bearing that allows three degrees of rotational freedom.

15. The dual reflector holddown recited in claim 6 wherein the reflector attachment assembly includes axial adjustment and axiai displacement apparatus that selectively prevents axial motion of the bearing.

* * * * *